July 14, 1970 W. F. RETHWISH ET AL 3,520,063
MULTIAXIS INSPECTION PROBE
Filed Aug. 30, 1968 2 Sheets-Sheet 1
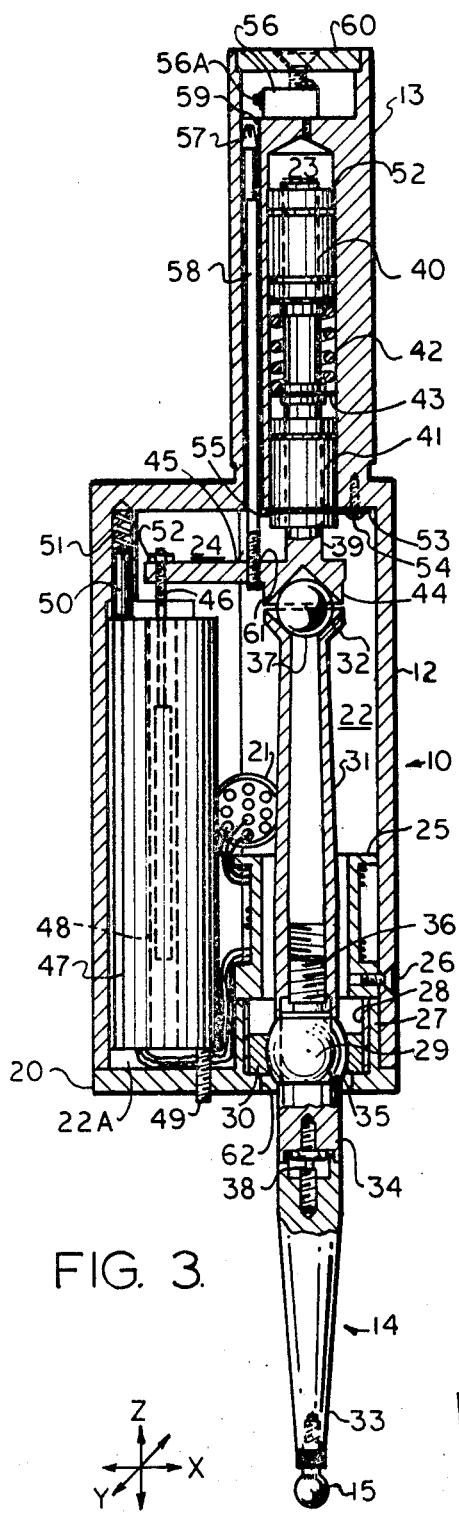
FIG. 3.
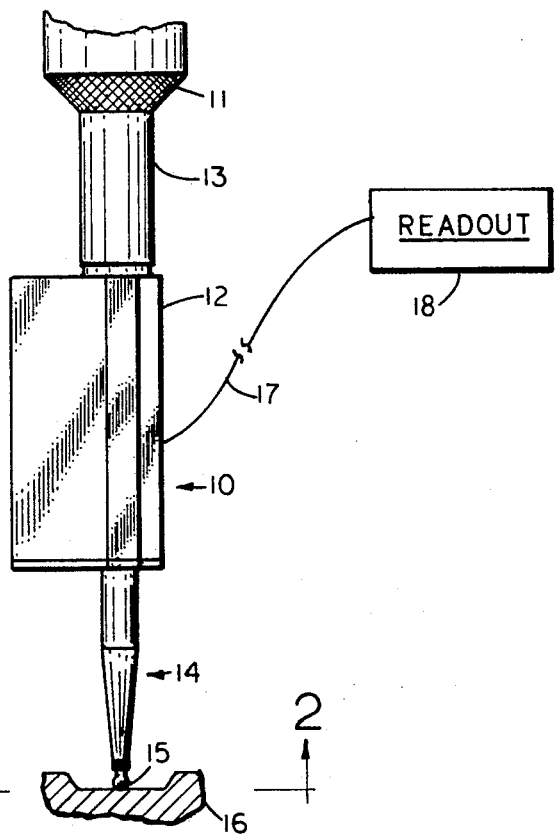
FIG. 1.
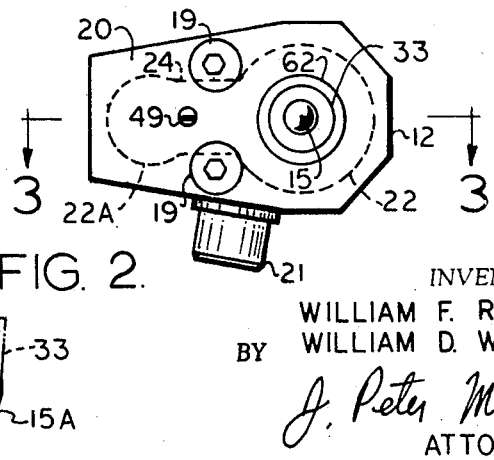
FIG. 2.
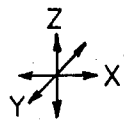
INVENTOR.
WILLIAM F. RETHWISH
WILLIAM D. WILSON
BY
J. Peter Mohn
ATTORNEY

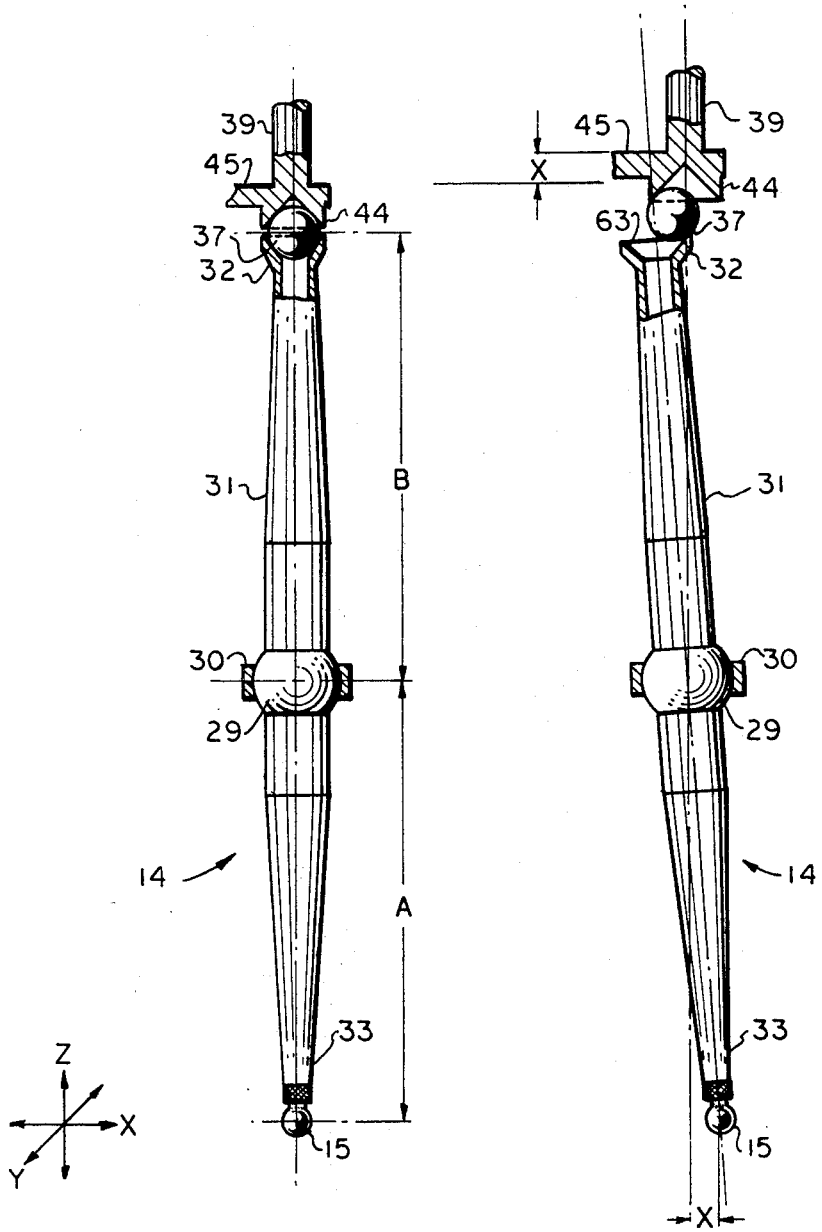

United States Patent Office 3,520,063
Patented July 14, 1970

3,520,063
MULTIAXIS INSPECTION PROBE
William F. Rethwish, Bonita, and William D. Wilson, San Diego, Calif., assignors to Rohr Corporation, Chula Vista, Calif.
Filed Aug. 30, 1968, Ser. No. 756,649
Int. Cl. G01b 3/22, 5/20
U.S. Cl. 33—169  3 Claims

ABSTRACT OF THE DISCLOSURE

A probe of the type used in automatic numerically-controlled inspection systems for checking sizing of machined articles is disclosed. The probe is responsive to movement along either of three axes to effect an electrical signal indicative of same. The structure of the probe includes an elongate member partially extending into a housing and supported by a spherical bearing slidably secured within one end of the housing. The end of the elongate member which extends into the housing is provided with a cone-shaped extension containing a ball and mated to a similar cone-shaped element of an opposing spring biased follower structure. Deflection of the exterior end of the elongate member in any direction results in a deflection of the follower by a similar amount. A transducer is provided to sense the follower movement.

Background of the invention

This invention relates to inspection probes and more particularly to probes as used for inspecting machined parts with a numerically-controlled machine.

The problem of inspecting dimensions of complex machined parts has been greatly simplified in recent years with the advent of numerically-controlled (N/C) machines. The method by which such inspections are performed is well known and basically involves the substitution of a probe in place of the tool in the spindle of the N/C machine. The machine is then actuated and driven over the workpiece under influence of some inspection program. The probe detects various dimensional quantities as it progresses across various surfaces and by comparing the detected quantities with predetermined normals, errors, or deviations from standard, can be observed.

The tolerances to which the machine operates and hence to which the probe must conform are typically extremely critical. The various probes of the prior art have exhibited some difficulty in this regard. The probe must be responsive to the slightest deflection and hence must be as frictionless a device as possible. The reduction of friction and the necessary dimensional tolerances tend to counteract each other as design considerations since freeing the movement of parts tends to make them dimensionally loose or sloppy. One particular problem associated with devices of the prior art has been the inability of the probe to return precisely to zero after having been deflected in some direction. This has necessitated frequent recalibration or zeroing of prior art probes.

Summary of the invention

An object of this invention therefore, is to provide an improved multiaxis inspection probe.

A more particular object of this invention is to provide a multiaxis probe for an automatic numerically controlled inspection system.

A further object of this invention is to provide a low-friction high-accuracy inspection probe for measuring machined surfaces in conjunction with a numerically-controlled inspection system.

The instant invention achieves the above-noted objects by providing an inspection probe having a new and novel structure including an elongate housing having a bore therethrough and a rigid elongate member having an enlarged spherical portion substantially midway along its length. The elongate member is provided at one of its ends with a substantially conical extension arranged to receive a ball in rotating relationship thereto. The spherical portion of the elongate member is rotatably mounted in a spherical bearing which in turn is slidably disposed in the housing bore. The end of the elongate member which has the conical extension is aligned to extend into the bore where it is mated to a slidable elongate follower member which is coaxial to the center of the spherical bearing. The follower has a conical extension similar to that of the elongate member and is arranged to mate with the latter in opposing relationship to confine a ball therebetween. The follower is spring-biased to maintain the latter relationship. A means for effecting an electrical signal in proportion to a linear displacement is mechanically coupled to the follower and provides an indication of any deflection of the elongate member or probe element.

The above and other objects and features of this invention will be better understood from the ensuing detailed description and appended claims taken in conjunction with the attached drawings wherein:

FIG. 1 is a partially schematic view showing how one embodiment of this invention is used in actual practice;

FIG. 2 is a view taken along line 2—2 of FIG. 1 and showing the bottom end of the embodiment of FIG. 1;

FIG. 3 is a cross-sectional view taken along line 3—3 of FIG. 2 showing the detailed structure of one embodiment of this invention;

FIG. 4 is a somewhat schematic view of the probing element of one embodiment of this invention showing in detail the geometry of same; and FIG. 5 is similar to FIG. 4 but shows the probing element in a deflected position.

Detailed description

Referring now to the drawings where one embodiment of an apparatus constructed in accordance with this invention is shown, it should be first noted that throughout all the figures, the same reference numerals have been used to indicate the same elements or parts. Referring particularly to FIG. 1, the general environment for which the invention is intended to be used can be best understood. In operation, the probe apparatus generally designated by numeral 10 is gripped or chucked in a spindle 11 of a machine (not shown) which is numerically controlled. The probe apparatus 10 includes a body or housing 12 having at one end a round shank portion 13 which is sized to fit the particular machine spindle or chuck used, usually a standard dimension. Extending from the other end of housing 12 is the elongate probe 14. The probe 14 is so supported in housing 12 that it is free to deflect for limited distances along any of three different orthogonal axes, as will become clear from the description to follow later.

Probe 14 is provided with a detachable tip 15 which makes the actual contact with the workpiece to be measured. The tip 15, shown threaded to the probe, has a generally spherical shape however, alternatively, a pointed tip such as shown as 15A could be substituted depending on the nature of the workpiece to be inspected. Such a workpiece is generally shown in FIG. 1 at 16. The probe is connected through electrical cable 17 to some suitable readout 18. The term readout as used in this instance is intended to cover any of the classes of devices which provide some useful format of information from an electrical signal. The readout could also include a suitable recording means so that a record of the measurements indicated by the probe would be made. The details of operation of the apparatus will be described later in conjunction with FIGS. 4 and 5.

Referring now to FIG. 2 a bottom view of the probe apparatus taken along line 2—2 of FIG. 1 reveals the preferred cross-sectional shape of housing 12. Suitable screws such as 19 for securing the base or end plate 20 of the housing to the remainder of the housing 12 are also visible in the view of FIG. 2. A suitable connector 21 for connecting the probe apparatus to its associated electrical equipment is mounted on the side of housing 12, as also shown in FIG. 3. A hole 62 is provided in end plate 20 to permit probe 14 to pass therethrough as can also be seen in FIG. 3.

The detailed structure can best be understood from FIG. 3, a sectional view taken along line 3—3 of FIG. 2. Referring now to FIG. 3, it will be apparent that housing 12 is essentially hollow and includes bored out regions 22, 21, 22A and 23. In its preferred embodiment housing 12 is a one piece structure, with the exception of its end plates, having the noted bored out regions. Bores 22 and 2A are interconnected along a portion of their adjacent sides by region 24 creating an open space for interconnection of the components to be described and which are mounted in the respective bores. The arrangement of the just described regions can be best seen in phantom in FIG. 2.

It should be noted that the housing need not be made exactly as described but same is shown merely for exemplary purposes. Bored region 23 extends from bore 22 through the shank portion 13 of the apparatus and is coaxial to the center axis of bore 22.

On the bottom end of bore 22 a tubular sleeve or spool 25 is fitted coaxially thereto. Spool 25 performs two functions. Firstly it provides a take-up for excess internal transducer wiring and secondly it operates as a stop for the probe 14 as will become apparent later. Spool 25 is held rigidly in its place by a set screw 26. End plate 20 is provided with a raised circular shoulder sized to fit within bore 22 and extending into the latter bore when the plate 20 is attached to the housing 12. Along the inner wall of shoulder 27 a bushing 28 is provided. Slidably mounted within bushing 28 is a spherical bearing assembly including an inner sphere 29 and an outer bearing 30 for receiving the sphere 29. Outer bearing is of course circular and hence fits within the shoulder 27 and its bushing 28. The spherical bearing assembly as used in one embodiment of this invention was one model of the type manufactured by the Southwest Products Company of Monrovia, Calif.

It should be apparent at this point that sphere 29 is free to rotate or pivot within bearing 30 while at the same time sliding along the central axis of bore 22 and within bushing 28 in a direction indicated as "Z" in FIG. 3. In FIG. 3, probe 14 and consequently sphere 29 are shown at rest, i.e., with no deflection in any direction.

Probe 14 includes an inner elongate member 31 having a substantially conical extension or cup 32 provided at its innermost tip. Extension or cup 32 is shown in section in FIG. 3 and it should be understood that it is an entirely symmetrical structure. The extension is so sized so as to receive a ball 37 therein in a manner to be more fully described with relation to FIGS. 4 and 5. Probe 14 also includes shaft 33 to which tip 15 is attached, by threading for example. Inner member 31 and shaft 33 are rigidly interconnected and connected to sphere 29 by a shaft 34. Shaft 34 is provided with a shoulder 35 which abuts the outside of sphere 29 and a reduced diameter threaded portion 36 which mates with a tapped portion of elongate member 31. Shaft 34 passes through a hole provided in sphere 29 and when member 31 is tightened onto threaded portion 36, the sphere is rigidly gripped between shaft 34 and member 31. Shaft 33 is attached to shaft 34 by a sacrificial stud 38 which is threaded into each of the latter shafts. Stud 38 is so designed that it will yield and break when a predetermined maximum force is applied to tip 15 and hence shaft 33. The latter situation can occur if the workpiece being checked is substantially off size or if an error should occur in the program, etc.

Within bore 23 and coaxial to the center of sphere 29, a spring-biased follower member 39 is disposed. Follower 39 is mounted within the bore 23 by a pair of very low friction bearings 40 and 41. Bearings 40 and 41 may be of the recirculating-ball type. Follower 39 is therefore arranged to slide along its central axis with a minimum of restraint. Coil sprig 42 is disposed about the follower and acts between bearing 40 and circular plate 43 which is rigidly affixed to follower 39. Spring 42 therefore biases follower 39 towards the probe 14. On the end of follower 39 which is adjacent the probe 14, a conical extension 44 is provided. Cone 44 is so sized to mate with opposing cone 32 and contain ball 37 therebetween.

Extending at right angles to follower 39 is an arm 45, on which is secured by threading and a lock nut 52, the actuating shaft 46 for a linear variable displacement transducer 47. Transducer 47 may be any one of that class of devices which produces discrete outputs of an electrical or hydraulic nature in response to very small mechanical displacements of an input. As shown, transducer 47 is a magnetic type having a moving core 48 attached to actuating rod 46. Core 48 is enclosed typically by coils (not shown) which are enclosed by the outer tubular casing of the transducer 47. Such transducers are readily available from suppliers and are further characterized by the feature that their output is linearly proportional to the displacement of the core. It should be noted that an electrical power source must be applied to the transducer for it to actually operate as desired, however, such details do not form a part of this invention and consequently have not been shown.

Bore 22A is so sized that the outer casing of the transducer 47 fits snugly within same. The exact position of the transducer 47 can be adjusted for calibration purposes by set screw 49 which is tapped through end plate 20 and contacts one end of the transducer casing. An opposing force is applied to the opposite transducer end by a small cylindrical plug 50 biased against the transducer casing by a spring 51.

As can be noted in FIG. 3, the electrical leads from the transducer are connected to connector 21 for attachment to the associated electronics equipment.

Referring back to the follower 39 and its associated structure it should be noted that bearing 40 is retained in place by being biased against a shoulder 52 by spring 42. Bore 23 then is of slightly reduced diameter at its innermost extremity as shown to result in the creation of the shoulder 52. Bearing 41 is secured from axial displacement by a plate 53 secured to housing 12 by at least one screw such as 54. The edge of plate 53 engages a groove 55 which is provided around bearing 41.

As an additional feature of the embodiment of this invention shown and described a limit switch 56 is provided, for disabling the entire system if the probe is subjected to excessive deflection in any direction and hence excessive force. Switch 56 is actuated by a trigger button 56a. Button 56a is in turn actuated by the tapered end 57 of a rod 58 which is slidably disposed within a bore 59 which extends parallel to the axis of follower 39 into bore 21. The end of shank 13 housing the switch is covered by end plate 60 which is suitably secured in place. The switch 56 can be connected to the motive source for the machine on which the probe is being used so that the power will be turned off if excessive probe deflection occurs.

The end of actuating rod 58 which extends into bore 21 is secured to arm 45 by treading as at 61.

Further details of the construction of the apparatus of this invention will be better understood from a discussion of the principles of operation to be described in conjunction with FIGS. 4 and 5. It may be noted that from the description to this point it should be apparent that the probe is free to translate along the Z axis merely by sliding in bushing 28 and since transducer core 48 will move an amount equal to the Z translation a properly proportional output will be produced. This latter situation is true since all motion is along the same or parallel axes and couplings between parts are direct. It is necessary however, in developing probes such as the one of this invention, to have the output proportional to probe deflections in other than Z axis, to wit, the X and Y axes. Conical extensions 32 and 44 and ball 37 perform such a function in the instant invention in a manner which will be better understood from FIGS. 4 and 5. The latter figures show probe 14 mounted in spherical bearing 29, 30 but disassociated with the remainder of the apparatus for reasons of simplicity.

In FIG. 4 the probe 14 is shown at rest, i.e., not subject to deflection along any axis. The geometry of the probe should be first considered at this point. By making the interior extension of the probe equal to the exterior the deflection at each end would of course be equal. In FIG. 4, this geometrical relationship of the probe components is illustrated by the dimensions A and B. A indicates the distance between the center of spherical tip 15 and the center of sphere 29. Similarly, distance B is measured between the respective centers of ball 37 at rest and sphere 29. As already indicated, distance A is normally made equal to distance B. It therefore follows that a deflection of tip 15 will result in an equal deflection of the point indicated as the center of ball 37 at rest. As will also become clear, follower 39 will be deflected an equal amount upward along the Z axis by the action of cones 32, 44 and ball 37. For this latter operation to take place certain constructional details must be followed. Firstly, the included angle of each of the conical extension or cones 32 and 44 must be 90°. Secondly the interior surface 63 of cone 32 must be slightly convex in nature as opposed to being flat. This latter detail is necessary to correct for the small but discrete change in dimensions caused by the displacement of the cone 32 through a discrete arc as shown in FIG. 5. The radius of the convex surface is related to the distance B.

Since follower 39 is restrained from motion in any direction but along the Z axis the operation of the device as is shown in FIG. 5 when tip 15 is deflected a distance X. The resultant displacement of cone 32 causes ball 37 to ride along the respective opposite side walls of cones 32 and 44.

With respect to its position at rest, the center of ball 37 rises a distance of ½ X. Similarly, with respect to ball 37, cone 44 and hence follower 39 rises a distance of ½ X. The net result is that follower 39 is translated a distance X with respect to its "at rest" position. Since all components are symmetrical, deflection along the Y or any intermediate axis would be accompanied by an equal deflection, or translation, of follower 39 and consequently core 48 of transducer 47. It might be noted at this point that as the ball 37 rolls between the two cone sections it approaches a point where it could escape from its constrained relation to said sections. Such a result is prevented by sleeve, or spool, 25 which acts as a stop for limiting the sideways deflection of probe shaft 31 to some predetermined amount.

In conclusion it may be noted that particular reference has not been made to the exact materials used to construct the various components of the invention, however, it should be apparent that any suitably rigid metal or the like should suffice for most parts.

It has been found that a probe constructed in accordance with this invention has operated in an improved manner compared to those of the prior art. Accuracy and repeatability heretofore unrealizable in the prior art devices have been achieved with an embodiment such as the one disclosed. Accordingly this invention provides an improved multiaxis measuring probe for N/C inspection systems.

What is claimed is:

1. An inspection probe for following a machined surface and producing an electrical output indicating dimensional variations in such surface comprising
    a housing having a cylindrical shank on one end thereof for chucking in a spindle of a numerically controlled machine, and having an enlarged, hollow, housing portion co-extensive with the shank portion, the shank portion being bored to open into the interior of the enlarged housing portion,
    a removable end plate closing the opposite end of the enlarged housing portion from the shank portion,
    a spherical bearing mounted on the end plate for slidable, guided movement of the spherical center of the bearing along an extension of the axis of the bore of the shank portion,
    an elongated probe having a fixed spherical portion intermediately of its length mounted for universal swivel movement in said spherical bearing, said probe having a work-contacting tip on an extending end thereof, and having a conical, ball receiving seat formed co-axially in the other end thereof, and directed toward the shank bore,
    a spring biased follower mounted for axial slidable movement co-axially within the shank bore and having a co-axial conical recess facing the conical recess in the probe,
    a ball mounted within the facing conical recesses and retained therein by the spring bias of the follower,
    a coil of a variable transducer mounted in the enlarged housing portion laterally adjacent the probe,
    a lateral projection on the follower overlying, and clear of an end of the coil, and
    a core mounted on the lateral projection and supported for axial movement co-axially within the coil upon axial movement of the follower by displacement of the probe.

2. An inspection probe as defined in claim 1 wherein the coil is retained in the housing by the end plate and is exposed for inspection and removal upon removal of the end plate.

3. An inspection probe as defined in claim 1 wherein a spool is removably mounted within the larger housing portion co-axially around the probe for winding excess wire thereon.

References Cited

UNITED STATES PATENTS

| | | | |
|---|---|---|---|
| 2,439,565 | 4/1948 | Egor | 33—172 |
| 2,766,003 | 10/1956 | Dall et al. | 90—62 |
| 3,024,808 | 3/1962 | Woodruff | 251—3 |
| 3,121,370 | 2/1960 | Larsen | 90—62 |
| 3,250,012 | 5/1966 | Hilton et al. | 33—172 |

FOREIGN PATENTS

| | | |
|---|---|---|
| 687,777 | 1/1964 | Canada. |
| 1,184,972 | 7/1962 | Germany. |

HARRY N. HAROIAN, Primary Examiner

U.S. Cl. X.R.

33—174